3,195,605
// TIRE RIM
// Robert William Mayfield, Akron, Ohio, assignor to The Firestone Tire & Rubber Company, Akron, Ohio, a corporation of Ohio
// Filed Jan. 18, 1963, Ser. No. 252,446
// 3 Claims. (Cl. 152—396)

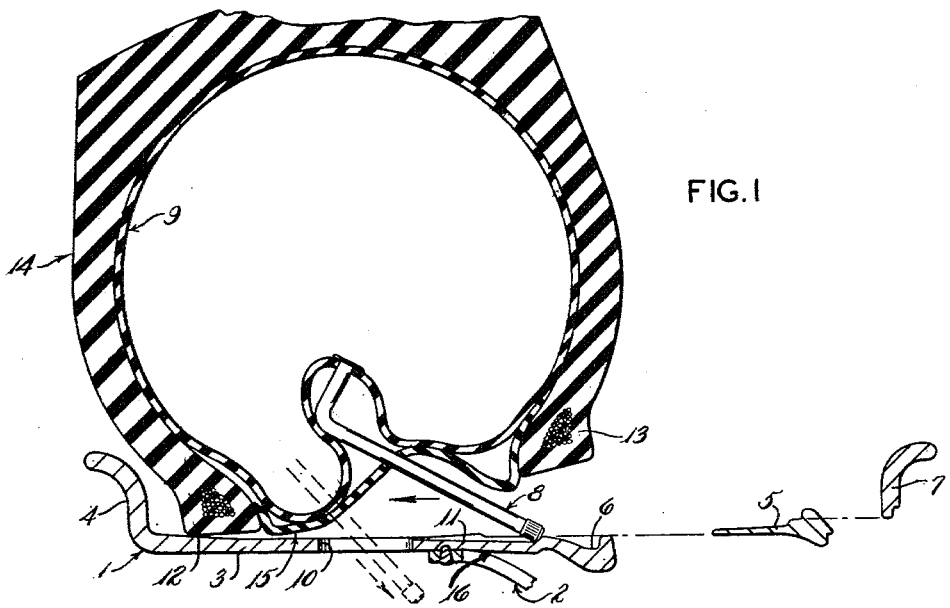
FIG. 1
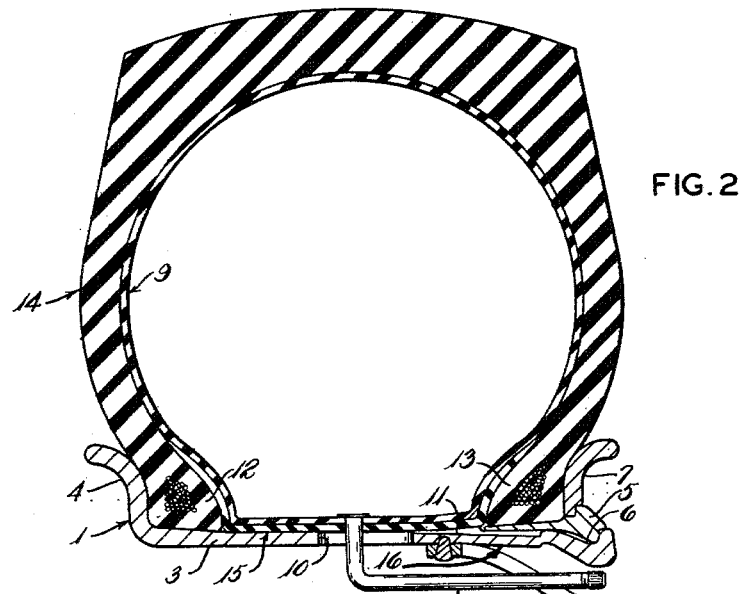
FIG. 2
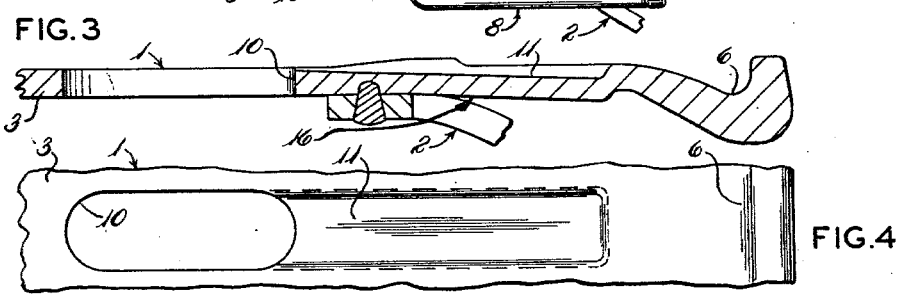
FIG. 3
FIG. 4

The present invention relates to pneumatic tire rims, and more particularly to the type of rim which employs an annular base member in combination with a removable side-ring member on at least one side of said base.

More specifically, the present invention is directed to the provision of a novel valve guide useful, for example, for truck tires.

The valve slot in a truck rim normally comprises an opening through the rim base extending substantially from the central portion of the rim base outwardly toward the gutter area.

These conventional, long axial valve slots pose a multitude of problems in a rim: water is forced centrifugally into the rim-tire interior, resulting in rust; the excessive metal removed from the rim base decreases its strength and affects rim symmetry as well as balance; and, where the wheel disc is fastened to the rim by means of a circumferential weld, the continuity of the weld must be interrupted for the width of the valve slot, a costly deviation.

Shortening the valve slot axially has been proposed in the past, but does not solve the problem, for the following reasons:

It is standard practice, in mounting a tubed truck tire on a removable side-flange rim, to lay the rim, without side flange, on the ground, with the gutter up. One side of the first tire bead is now placed as far down onto the rim base as possible, in the area of the rim valve slot; because of the closeness in diameters of bead and rim, the opposite, or "up," side of this first bead will not yet be on the rim base. The tire is, in other words, cocked on the rim base, with the "down" side generally in place. The short valve-slot is located generally in the middle of the rim base, and conventionally the tube valve stem would now be inserted through this slot. Once the valve stem was placed through the slot, the "down" side of the bead must be lifted, to allow the "up" side to pass onto the rim base. As the "down" side of the bead is moved upward, the tube with its valve stem must follow, but the shortness of the valve slot would prevent the necessary axial motion of the valve stem: it now becomes necessary to allow the valve stem to "escape" back through the valve slot in order to move the tire bead the required amount, and valve extension tools, pliers-like valve-grippers or other auxiliary equipment is required to enable the operator to retain or recapture the valve end. A similar situation arises where the valve is not originally passed through the slot; in such case it must, of course, still be trapped later and pulled into position.

In order to make possible the rapid and trouble-free mounting of a truck tire on a rim having a short valve slot, and to overcome the problems of locating and securing the valve stem, the present invention provides an axial trough adjoining the valve soft and extending axially toward the rim gutter. This trough may be formed in the metal of the rim base, as shown in the preferred form of the invention, or it may comprise a small separate trough member placed on the rim base adjacent the valve slot.

This trough traps and guides the valve end during the crucial phase of the mounting operation, obviating the need for special valve tools, and making it possible to realize the advantages of a smaller valve slot such as water exclusion, balance and wheel fastening.

It is therefore an object of the present invention to provide a rim upon which tubed-type tires may be mounted without special valve tools.

It is another object of the present invention to provide in a rim means to facilitate the trapping and guiding of a tube valve-stem end during the mounting of a tire.

Yet another object is to form a stronger, better balanced truck tire rim with a small valve slot which is susceptible of economical fastening to a disc wheel.

A further object is to provide a rim having a trough-shaped valve-end trap and guide adjacent the valve slot.

These and other advantages and objects will become more apparent by reference to the following specifications and drawings in which:

FIGURE 1 is sectional exploded view showing a tire and tube being mounted on a rim constructed in accordance with the invention.

FIGURE 2 is a view similar to FIGURE 1 but showing the tire, tube and rim in completely assembled position.

FIGURE 3 is an enlarged fragmentary sectional view of the rim trough of the invention.

FIGURE 4 is a plan view of FIGURE 3.

The invention is generally shown in combination with a truck rim-and-wheel assembly, in which the rim is generally denoted by the numeral 1 and the disc wheel by the numeral 2.

The rim is basically of the conventional type, which comprises an annular base member 3 having a radial fixed flange 4 at one side, and a locking ring 5 carried in a gutter 6 at the opposite side of the rim base and supporting a radial side flange 7.

The short slot extending through the rim base and adapted to receive the valve 8 of the inner tube 9 is denoted by the numeral 10; this valve slot 10 is shown as communicating directly with a radially outwardly opening trough 11 formed of axial walls extending toward the gutter 6 of the rim base 3. The trough 11 as shown has substantially the same width as the valve slot 10; it has a minimum depth where it communicates with the valve slot and maximum depth at its opposite end, for reasons which will become clearer as this description proceeds.

As the "down" side of the tire bead 12 is slid onto the rim base 3, the end of valve 8, instead of now being passed through the valve slot 10, is "trapped" in the end of the trough 11 nearest the rim gutter 6. While the valve end is thus not in a position to block the necessary movement of the "down" side of the tire bead 12, still it is retained against displacement. As the "down" side of the bead 12 is lifted to allow mounting of the "up" side of the bead, the bead 12 moves unimpeded over the valve slot 10, while the valve end remains trapped in the axially outer end of the trough 11. When the entire said first bead is now slid onto the rim base 3, and the second bead 13 is pushed on to allow placement of locking and side rings 5 and 7 respectively, the tire 14 will move the tube 9 axially, whereby the valve end 8 slides axially along the trough 11 until it reaches the valve slot 10 and pops through into position.

While it is desirable that the trough 11 be deepest at the end nearest the rim gutter 6 in order to provide an effective "trap" for the end of the valve 8, it is important, for the reasons set forth above, that a minimum amount of metal be removed from the rim base 3; for this reason, the trough 11 is made rather shallow where it communicates with the valve slot 8.

A flap member 15 may be used in conjunction with this tubed truck-tire 14, in which case the flap will, due to the inflation pressure within the tube 9, seal tightly around the small opening remaining around the valve stem, thus sealing out moisture and dirt, which otherwise would result in rusting of the rim.

The preferred form of the invention as shown and described is directed to an embossed trough, which has the further advantage of providing at 16, on the inner face of the rim base 3, a section which may be utilized as a driving member when this rim 1 is mounted with a so-called cast wheel, rather than the disc wheel described. Alternatively, the trough member, as stated previously, may comprise a member separate from the rim; or, the trough may be formed by a pair of axially extending, radial protrusions in the rim base, instead of by an axial recess in the rim base. Further, instead of being substantially rectangular, the trough may be oblate or, indeed, tear-drop shaped.

It will be seen that the present invention thus provides the means for quickly, easily and accurately placing the innertube valve stem in a small, easily sealed valve slot. The strength of the rim is enhanced by the absence of an axial slot extending all the way to the rim gutter, the construction further diminishing the balance-, symmetry-, and fastening-problems of the rim.

Although a preferred form of the invention has been shown and described, it will be obvious that modifications will occur to those skilled in the art with departing from the scope of the invention as defined in the appended claims.

What I claim is:

1. A rim for a tube-carrying vehicle tire, having a valve hole, and a valve-guide comprising an outwardly facing trough of varying depth communicating at its one end with the rim valve hole and having its maximum depth near its other end, whereby to trap the end of the tube-valve during mounting of the tire on the rim.

2. A rim for a tube-carrying vehicle tire, having a valve hole and a valve-guide comprising a longitudinal, axially outwardly closed trough of varying depth communicating at its one end with the rim valve hole and having its maximum depth at its closed end, whereby to trap the end of the tube-valve during mounting of the tire on the rim.

3. A rim as in claim 2, wherein the base of said valve-guide slopes downward from the rim valve hole.

References Cited by the Examiner

UNITED STATES PATENTS

| 1,522,941 | 1/25 | Brunner | 301—11 |
| 1,603,338 | 20/26 | Hawkinson | 152—427 X |
| 1,649,678 | 11/27 | Freivogel | 301—5 |

ARTHUR L. LA POINT, *Primary Examiner.*

MILTON KAUFMAN, *Examiner.*